No. 700,509. Patented May 20, 1902.
A. P. KNAUBER & H. OSTWALD.
ROLLER.
(Application filed Sept. 16, 1901.)
(No Model.)
Fig. 1.
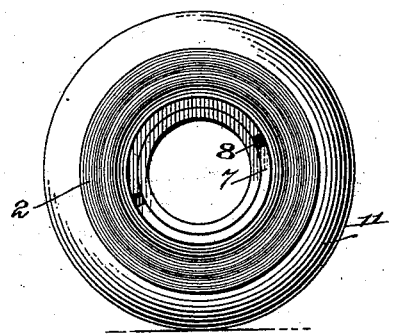
Fig. 2.    Fig. 3.    Fig. 4.
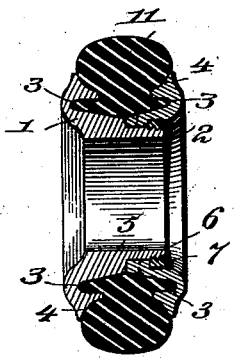 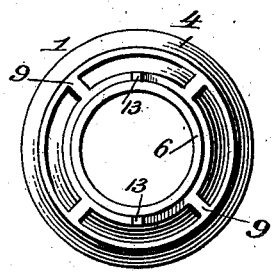 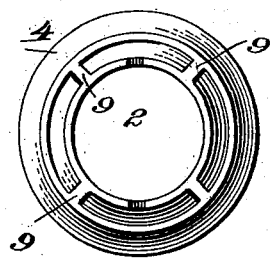
Fig. 5.    Fig. 6.    Fig. 8.
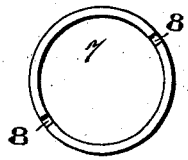 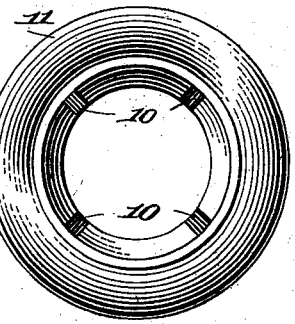 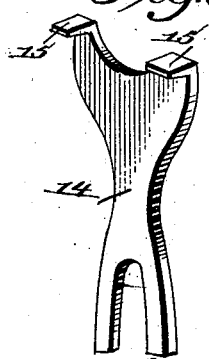
WITNESSES:    Fig. 7.
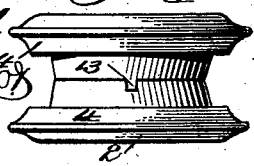
INVENTORS
Albert Peter Knauber
Herman Ostwald
BY
Victor J. Evans Attorney

UNITED STATES PATENT OFFICE.

ALBERT PETER KNAUBER AND HERMANN OSTWALD, OF MILWAUKEE, WISCONSIN.

ROLLER.

SPECIFICATION forming part of Letters Patent No. 700,509, dated May 20, 1902.

Application filed September 16, 1901. Serial No. 75,524. (No model.)

*To all whom it may concern:*

Be it known that we, ALBERT PETER KNAUBER and HERMANN OSTWALD, citizens of the United States, residing at Milwaukee, in the county of Milwaukee and State of Wisconsin, have invented new and useful Improvements in Rollers, of which the following is a specification.

Our invention relates to rollers especially adapted for roller-skates; and its primary object is to provide a roller of novel construction which will render the skates comparatively noiseless, thus overcoming a series of objections to the hardened wooden rollers heretofore commonly used.

A further object of the invention is to provide a roller with a yielding tire or tread-surface which will prevent slipping, and thus obviating the necessity of using chalk or rosin on the floors of roller-skating rinks and avoiding the dust which the sprinkling of chalk or rosin creates.

A further object of the invention is to provide a roller comprising detachable sections between which the yielding tire is secured removably.

The construction of the improvement will be fully described hereinafter in connection with the accompanying drawings, which form part of this specification, and its novel and characteristic features will be defined in the appended claims.

In the drawings, Figure 1 is a side elevation of a roller embodying the invention. Fig. 2 is a transverse section of the same. Fig. 3 is an elevation of the inner side of one of the separable sections of the roller. Fig. 4 is a similar view of the other section. Fig. 5 is a plan of the securing-ring of the roller. Fig. 6 is a side elevation of the roller-tire. Fig. 7 is an edge view of the two side sections of the roller connected with the tire removed, and Fig. 8 is a perspective view of a tool for applying and removing the ring.

The reference-numerals 1 and 2 designate the sides of the roller, each comprising a metal disk having its edge projected inward to form an annular groove 3 and its periphery 4 beveled, as shown in Fig. 2.

The section 1 is formed with a sleeve 5, constituting the bearing of the roller and adapted to extend through the section 2. The inner projecting end 6 of the sleeve is externally screw-threaded to receive a locking-ring 7, having internal screw-threads to fit the end of the sleeve and diametrically opposite slots 8 to receive the tool shown in Fig. 8.

The inner faces of both of the sections 1 and 2 are formed with radial lugs 9, adapted to enter corresponding radial recesses 10, formed in the opposite faces of the tire 11, which is formed of rubber or other yielding material.

The rubber tire or tread of the roller is formed with annular flanges 12, fitting the grooves 3 and having the recesses 10, above referred to, which prevent creeping or rotary movement of the tire upon the roller.

The sections 1 and 2 are prevented from independent rotary movement by means of lugs 13, projecting at diametrically opposite points on the sleeve 5 and fitting corresponding recesses on the section 2.

It will be apparent that the rubber tire is firmly clamped between the two sections 1 and 2 and is held against rotation except with the roller-sections and, further, that the tire may be readily renewed when unduly worn by removing the ring 7 with the wrench shown in Fig. 8. This implement consists of a handle or body 14 and laterally-extending parallel lugs 15, spaced apart to fit the slots in the ring 7.

We claim—

1. A roller comprising separable sections each formed with an annular groove on its inner face, and one of said sections having a threaded sleeve extending into the other section, lugs diametrically arranged on the said sleeve adapted to fit in corresponding recesses in the opposite section, a yielding tire flanged to fit said grooves, and an internally-threaded ring fitting on the threaded end of the sleeve.

2. A roller comprising separable sections each formed on its inner face with an annular groove, and one of said sections having a threaded sleeve extending into the other section, a rubber tire formed with annular flanges fitting said grooves, radial lugs on the sections to prevent movement of the tire except with the roller, and means for preventing the roller-sections from independent rotary movement.

In testimony whereof we affix our signatures in presence of two witnesses.

ALBERT PETER KNAUBER.
  HERMANN OSTWALD.

Witnesses:
 WILLIAM F. BOLL,
 ROBERT G. WENDLAND.